John M. Sheesley
INVENTOR.

BY
ATTORNEY

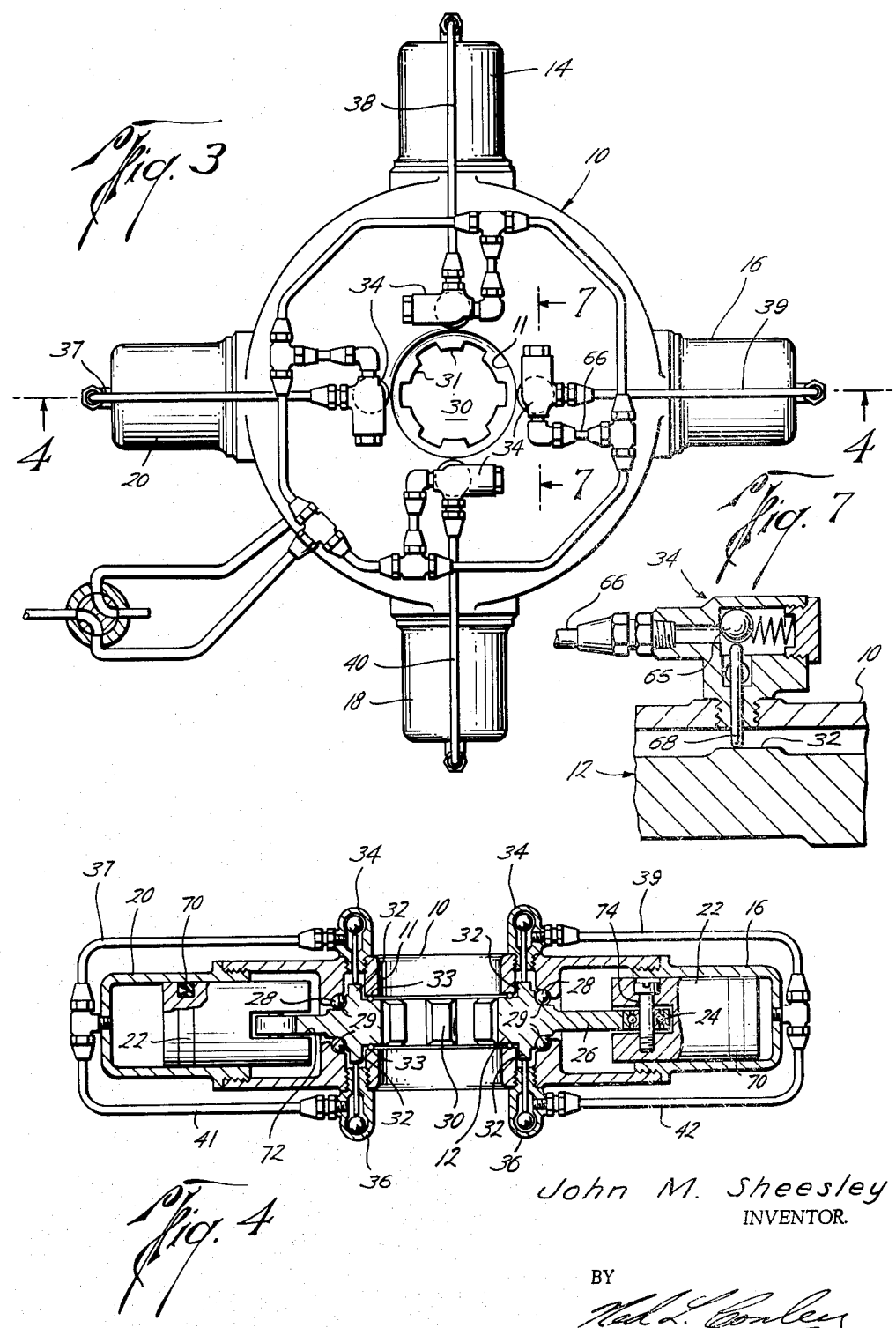

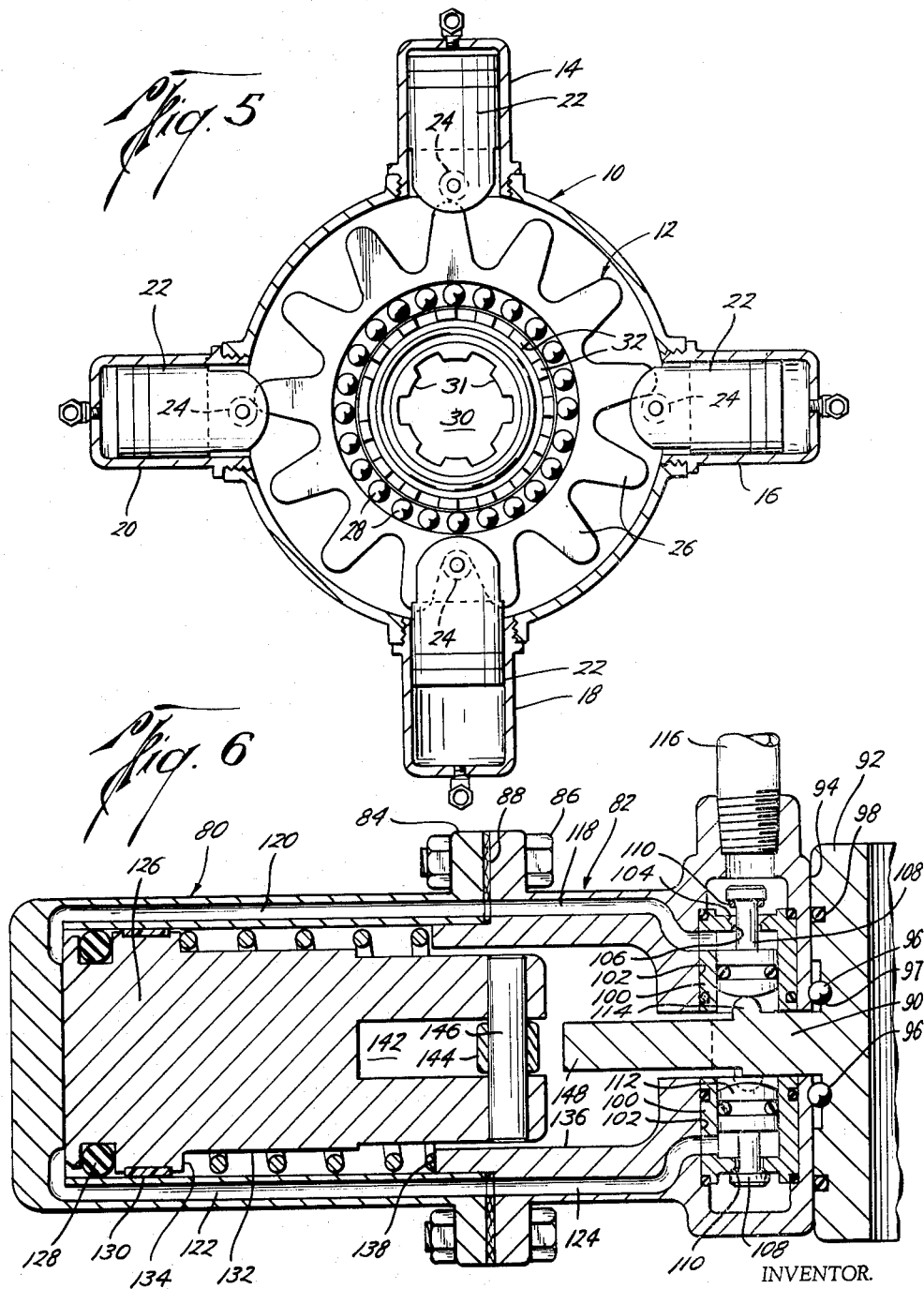

United States Patent Office 3,203,318
Patented Aug. 31, 1965

3,203,318
VALVE OPERATOR
John M. Sheesley, P.O. Box 9365, Houston 11, Tex.
Filed Dec. 11, 1962, Ser. No. 243,791
6 Claims. (Cl. 91—186)

This invention relates to fluid motor apparatus such as may be used for providing power operation of valves, particularly large valves such as are used in oil and gas pipelines. The valve operator of this invention is adapted to allow either manual or power operation of such valves.

Large gate valves such as are used in cross-country pipelines for gas and petroleum products and also large plug valves and other types of valves which are in common use require a considerable torque for their operation. It has therefore been the practice to provide power means for operating such valves. Such power means may constitute an electric motor which drives a mechanism attached to the valve stem, or in other instances fluid motors of various types have been provided. Normally such fluid motors as have been used for the operation of such valves are positively engaged with the valve stem and are substituted for any means which might have been provided for manual operation of the valve.

The apparatus of the present invention provides means by which a valve may be selectively operated manually or by fluid motor. According to this invention the fluid motor automatically engages the valve stem when power operation is required; however, when manual operation of the valve is found necessary or desirable the apparatus of this invention automatically disengages from the valve stem so that manual operation of the valve can take place without any interference from the fluid motor. Such automatic engagement and disengagement of the fluid motor with the valve operating mechanism is obtained by virtue of the novel fluid motor and various novel features thereof. For a better understanding of such fluid motor and the novel features thereof reference is now made to the accompanying drawing, wherein:

FIGURE 3 is a plan view of one embodiment of the apparatus of this invention;

FIGURE 4 is a vertical sectional view of the embodiment shown in FIGURE 3 taken at line 4—4 of FIGURE 3;

FIGURE 5 is a horizontal sectional view of the embodiment of the invention shown in FIGURE 3;

FIGURE 6 is an enlarged sectional view of a modification of the valve and piston arrangement used in the apparatus of this invention; and FIGURE 7 is an enlarged sectional view of a valve used in the embodiment of FIGURE 3, taken at line 7—7 of FIGURE 3.

Figure 1:
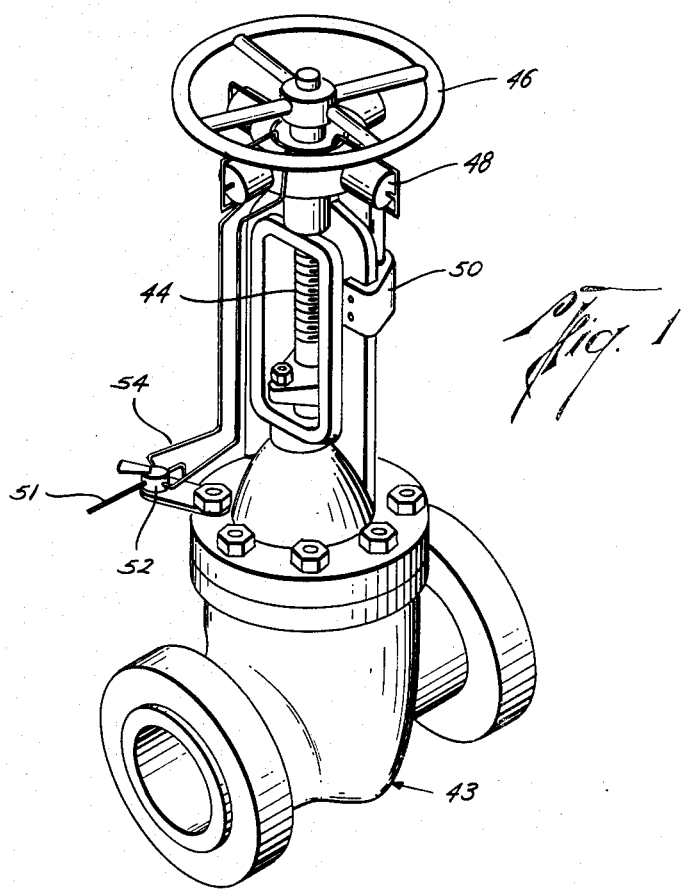
FIGURE 1 depicts a conventional gate valve to which one embodiment of the fluid motor of this invention has been attached.

Initially reference is made to FIGURE 5 of the drawing in particular, together with FIGURES 3 and 4, for an understanding of the basic features of the apparatus of this invention. As shown, the embodiment disclosed in FIGURE 5 comprises a housing 10 having a centrally disposed opening 11 therethrough, and containing a cam wheel 12 rotatably disposed coaxially therewith. The cam wheel also is provided with a central opening 30 in which means such as splines 31 are provided for engagement with a valve stem. The housing 10 has disposed around its circumference a plurality of fluid cylinders 14, 16, 18 and 20. The axes of these cylinders extend radially from the center of the housing. Each cylinder contains a slidable free piston 22. Each piston 22 is provided adjacent its radially inner end with a rotatable cam follower 24, which is adapted to follow camming surfaces on the cam wheel. Thus the pistons 22 are free pistons in the sense of a free piston engine, since there is no permanent connection between the pistons and the mechanism driven by the pistons.

As shown in FIGURE 5 the cam wheel somewhat resembles a sprocket in that it is provided with a plurality of lobes 26 surrounding its circumference. The lobes 26 provide camming surfaces which are engaged by the cam followers 24 upon radial movement of the pistons 22. In addition to the lobes 26 the cam wheel is provided with other camming surfaces 32 which are adapted to operate air inlet valves 34 and exhaust valves 36. Operation of these valves causes fluid under pressure to be supplied through the various conduits 37, 38, 39, 40 to the fluid cylinders for actuation of the pistons 22 and for exhausting of fluid from said cylinders through conduits such as conduits 41 and 42.

The cam surfaces 32 on the cam wheel 12 are so positioned with respect to the lobes 26 that upon the application of fluid under pressure to the system fluid is supplied to one of the cylinders 14, 16, 18 and 20 so as to cause the piston 22 in such cylinder to move radially inwardly toward the cam wheel and thereby cause a cam follower 24 to engage one of the lobes 26 so as to cause rotation of the cam wheel. The relative positioning of the various camming surfaces on the cam wheel provide for sequential operation of the pistons 22 so as to provide for continuous engagement of a cam follower 24 with a lobe 26 so as to continuously rotate the cam wheel. When one of the pistons 22 has moved to the limit of its inward travel, as determined by the bottoming of a cam follower 24 at the root between two lobes 26, one of the camming surfaces 32 is so positioned as to cause the opening of an exhaust valve 36 so as to exhaust the pressure fluid from the cylinder in which such piston is received. The force biasing the piston radially inwardly being thus removed, the piston may be moved radially outwardly by the engagement of the reverse side of the next adjacent lobe on the cam follower 24 of such piston, continued rotation of the cam wheel having been effected by engagement of another cam follower. Upon reaching its radially outermost position the cam wheel has again rotated sufficiently to open a valve 34 to provide fluid under pressure to cause the piston to be moved radially inwardly on the front side of the said next adjacent lobe to cause further rotation of the cam wheel.

Referring now to FIGURE 1, one embodiment of the apparatus of this invention is there shown installed on a typical gate valve 43. The gate valve there shown is provided with the usual valve stem 44 for movement of the gate (not shown) to which is attached a standard hand wheel 46. The valve operator of this invention is positioned on the stem 44 intermediate the hand wheel and the body of the valve and is designated by reference numeral 48 in FIGURE 1. Rotation of the housing of the valve operator with respect to the valve body is prevented by means of a torque arm 50 rigidly fastened to the valve. Air or other fluid under pressure is admitted to the valve operator from a fluid supply (not shown) through conduit 51, conventional 4-way valve 52, and conduit 53. Exhaust fluid from the valve operator is released through conduit 54.

Figure 2:
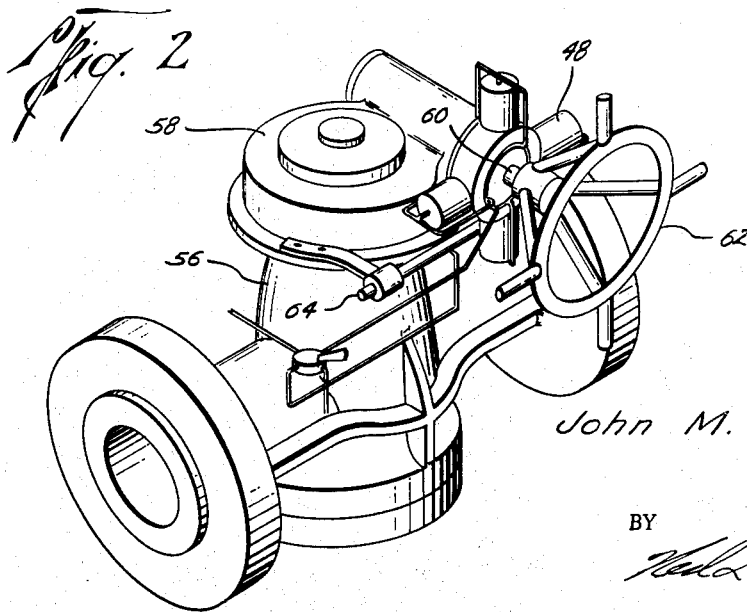
FIGURE 2 depicts a conventional plug valve having thereon a conventional gear reduction unit to which one embodiment of the apparatus of this invention has been attached.

FIGURE 2 of the drawing shows an adaptation of the apparatus of this invention to a conventional plug valve 56. The plug valve there shown is provided with a conventional gear reduction unit such as a worm and pinion reduction unit 58. As is well known in the art, the worm of the gear reduction unit 58 is affixed to a worm shaft 60 upon which a hand wheel 62 is affixed for rotation therewith. A valve operator 48 is positioned on the shaft 60 intermediate the hand wheel and the gear reduction unit. As in the embodiment shown in FIGURE 1, the valve operator 48 is prevented from rotating by means of a torque arm 64 attached to the gear reduction unit.

It will be apparent that the operation of the valve operator 48 in the embodiment shown in FIGURE 2 is substantially identical to that shown in FIGURE 1 except that the operation is through the gear reduction unit and not directly to the valve. It will also be apparent that the valve in either case may be operated either by means of the valve operator or by means of the hand wheel. If fluid pressure is released from the cylinders on the valve operator, the pistons 22 are not biased radially inwardly thereby, but instead are free to be moved radially outwardly by engagement of the lobes of the cam wheel with the cam followers, and therefore the cam wheel is left free to rotate with respect to the housing 10. Thus the valve may be operated without restriction by means of the hand wheel, since the valve operator does not prevent the necessary rotation of the valve stem in the case of the embodiment shown in FIGURE 1 or of the worm shaft in the case of the embodiment shown in FIGURE 2.

In the embodiment of the invention shown in FIGURES 3, 4 and 5 the cam wheel 12 is mounted for rotation within the housing 10 by bearing means as for example ball bearings 28 circularly disposed in races 29 around the opening 11 of the housing. A seal such as an O-ring 33 provides retention of lubricant for the bearings and the other working parts of the mechanism.

Reference is now made to FIGURE 7 for a disclosure of one type of valve useful in the apparatus of this invention. Here one of the inlet valves 34 is shown in section. It will be seen that the valve comprises a spring loaded ball check 65 which normally closes off a pressure fluid conduit 66. A push rod 68 extends through the wall of the housing 10 and is engaged by one of the camming surfaces 32 and in turn engages the ball check 65 to cause the ball check to be moved off its seat so as to allow fluid under pressure to pass through the valve 34 and into one of the cylinders. Similar structure is used for the other valves 34 and also for the exhaust valves 36.

In this embodiment of the invention the pistons 22 are each provided with conventional piston ring sealing members 70 which may for example be of the cup type as shown. Each piston is slotted at 72 on its radially inner end and is provided with a wrist pin 74. The cam follower 24 may comprise a ball bearing as shown mounted upon the wrist pin and received in the slot 72. The cam follower 24 thus has rolling engagement with the lobes 26 of the cam wheel.

A somewhat modified form of valve and piston structure is shown in the embodiment depicted in FIGURE 6. In this embodiment a cylinder 80 is attached to a housing 82 as by means of flanges 84 and bolts 86. A gasket 88 is provided between the flanges. The cam wheel 90 is provided with a hub 92 which is rotatably disposed in a central opening 94 in the housing 82. Bearings 96 in bearing races 97 provide means rotatably mounting the hub within the housing. O-rings 98 extending around the circumference of the hub sealingly retain lubricant in the bearing space.

In this embodiment of the invention the inlet and exhaust valves each comprise a valve seat member 100 sealingly received within a valve chamber 102 in the housing. Each valve seat member has a seating surface 104 surrounding a passageway 106 therethrough. A valve body 108 is slidably received within the valve seat member and has a sealing ring 110 provided on its closure portion for sealingly engaging the seating surface 104 of the valve seat. Each valve body is also provided with a piston head portion 112 which is sealingly and slidably received within the valve seat member and is adapted to be engaged by camming surfaces 114 on the cam wheel.

It will be noted that the piston portion 112 of the valve body has a larger area than the valve closure portion. This insures that when the system is pressurized the force due to pressure tending to keep the valve closed is greater than the force due to pressure tending to open the valve, so that normally the valves will remain closed and are opened only by the action of the camming surfaces 114 upon the piston head 112. It will be apparent that when the valve is open air or other pressure fluid from a conduit such as 116 will pass through the passageway 106 of the valve seat member. A cored hole 118 in the housing and a communicating cored hole 120 in the cylinder attached thereto provide communication between the interior of the valve seat member and the radially outer end of the cylinder. Similar cored holes 122 and 124 are provided for exhausting of air or other pressure fluid from the cylinder through the exhaust valve.

The piston body 126 is provided with sealing and bearing elements such as O-ring 128 and bearing 130 which may for example be made of nylon or Teflon. The piston also has a reduced diameter section 132 which forms a shoulder 134 on the piston. The reduced diameter section is movable radially into a cavity 136 formed in the housing. The end of the housing surrounding the cavity 136 forms an abutment 138. A coil spring 140 positioned around the reduced diameter portion 132 of the piston engages the shoulder 134 and abutment 138 to bias the piston radially outwardly. The piston is slotted at 142 to provide an opening for a cam follower 144 which is mounted upon a wrist pin 146 extending transversely of the slot 142. The cam follower 114 is positioned to engage a lobe 148 on the cam wheel.

In this embodiment of the invention positive means are provided for biasing the pistion radially outwardly so as to insure that all of the pistons in the apparatus of the invention are maintained in a position clear of the cam wheel so long as there is no pressure on the system. Thus the cam wheel is free wheeling when the pressure is removed. This means that by merely removing pressure from the system the valve on which the operator of this invention is mounted may be operated by turning the usual hand wheel.

It will be appreciated that the torque exerted by the valve operator of this invention is directly proportional to the slope of the camming surfaces on the cam wheel which are engaged by the cam followers attached to the pistons. Thus to increase the torque the slopes of these camming surfaces may be increased. In addition it is possible to use two or more of the operators of this invention in series, that is, two or more of such operators on the same valve stem. If desired such operators may have different torque ratios provided by means of different cam surface slopes. In such an installation it would be possible to operate both operators at the same time where is a high resistance to rotation, as where there is a stuck plug in a plug valve, and then to utilize a governor or other means to cut out the flow of air to one of the operators when the valve core loosens up so that a lesser torque is required for operation of the valve. Upon cutting out the flow of air to one operator this operator becomes free wheeling and the other single operator may operate alone.

The embodiment of FIGURE 6, wherein positive means are provided for disengagement of the cam followers from the cam wheel, is particularly advantageous where a high slope of the camming surfaces is found necessary or desirable since such high slopes will obviously impair the outward movement of the cam followers by means of rotational forces acting upon the cam wheel.

Another advantageous result obtained by the valve operator of this invention is that it is readily made reversible merely by operating a valve to apply pressure to the exhaust side of the operator. Thus in the embodiment shown in FIGURE 1 the 4-way valve 52 may be operated either to apply pressure to the top side of the operator as shown in FIGURE 1 or to the bottom side. Applying pressure to one side would cause rotation in one direction, such as for example to close the valve, and applying pressure to the other side would cause rotation in the other direction, that is to open the valve.

The invention has principally been described in terms of its application as a valve operator, but other applications for the fluid motor of this invention will be apparent to those skilled in the art. For example, the form of the apparatus is readily adapted to a large central opening which can fit over a large driven member, such as a drawworks drum shaft. The provision by the invention of means for insuring the retraction of the cam followers from engagement with the cam wheel so that free wheeling is obtained, is especially advantageous in applications such as the powering of winches, where it is sometimes desirable to allow the winch line to be pulled freely off the drum.

Although various embodiments of the invention have been shown and described herein the invention is not limited to such embodiments but only as set forth by the following claims:

I claim:
1. Apparatus for operating a rotatable element having an operating stem comprising
   a hand-wheel adapted to engage said stem for rotation therewith, and
   a power operator on said stem adjacent said hand-wheel, said power operator comprising
      a housing having a central opening through which said stem passes,
      a rotatable cam wheel in said housing,
      means on said cam wheel engaging said stem for rotation therewith,
      a plurality of camming surfaces on the cam wheel,
      a plurality of pistons in said housing adapted to be moved toward said camming surfaces upon the application of pressure to the pistons, and
      a cam follower on each piston positioned to engage said camming surfaces in one position of the piston and to disengage from said camming surfaces in another position of the piston.

2. Apparatus as defined by claim 1 and including
   means resiliently biasing said cam followers toward a position disengaging them from said camming surfaces.

3. Apparatus as defined by claim 1 and including
   pressure fluid valve means on said housing normally preventing flow of pressure fluid to and from said pistons, and
   means actuable by the rotation of said cam wheel to actuate said pressure fluid valve means to allow the flow of pressure fluid to and from said pistons.

4. Apparatus as defined by claim 3 and including
   means resiliently biasing said cam followers toward a position disengaging them from said camming surfaces.

5. Apparatus for operating a rotatable element comprising
   a handwheel engaging said element for rotation therewith, and
   a fluid motor,
      said fluid motor comprising
         a rotatable cam wheel engaging said element,
         a plurality of pistons around said cam wheel,
         a cam follower on each piston positioned to engage said cam wheel to operate said rotatable element when fluid under pressure is supplied to said pistons and to disengage from said cam wheel when fluid under pressure is not supplied, whereby the rotatable element may be operated by said handwheel without moving the pistons.

6. Apparatus as defined by claim 5 and including a spring biasing each piston cam follower away from the cam wheel.

References Cited by the Examiner

UNITED STATES PATENTS

| | | | |
|---|---|---|---|
| 717,445 | 12/02 | Nestius. | |
| 1,502,244 | 7/24 | Gore | 91—188 |
| 2,095,255 | 10/37 | Holmes | 91—182 |
| 2,326,464 | 8/43 | Jones | 91—182 |
| 2,352,140 | 6/44 | Trott | 91—391 X |
| 2,738,945 | 3/56 | Shafer | 251—14 |
| 2,958,197 | 11/60 | Elliott | 91—186 |
| 2,984,222 | 5/61 | Smith | 91—188 |
| 3,084,513 | 4/63 | Casassa | 91—175 |
| 3,092,085 | 6/63 | Bataille | 91—203 |
| 3,105,415 | 10/63 | De Muth | 91—188 |

FOREIGN PATENTS

| | | |
|---|---|---|
| 1,092,400 | 4/55 | France. |
| 18,510 | 8/03 | Great Britain. |
| 20,849 | 11/29 | Netherlands. |

FRED E. ENGELTHALER, *Primary Examiner*.

SAMUEL LEVINE, *Examiner*.